Jan. 16, 1934.  H. E. SHAW  1,943,774
AIRPLANE
Filed Aug. 19, 1930
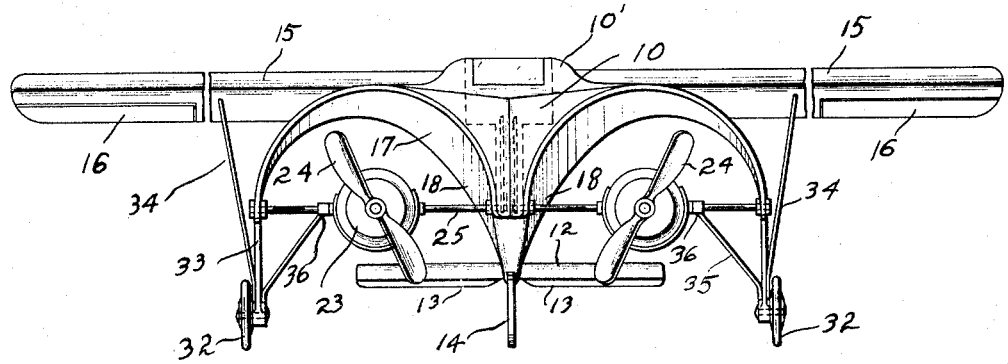
Fig. 1.
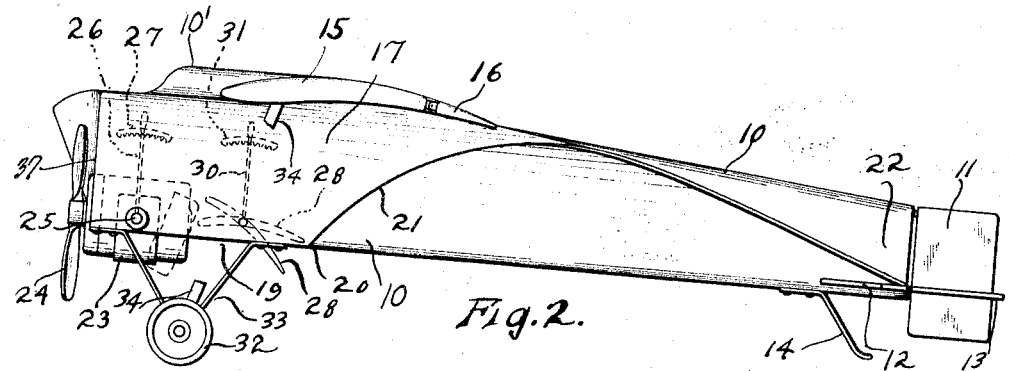
Fig. 2.
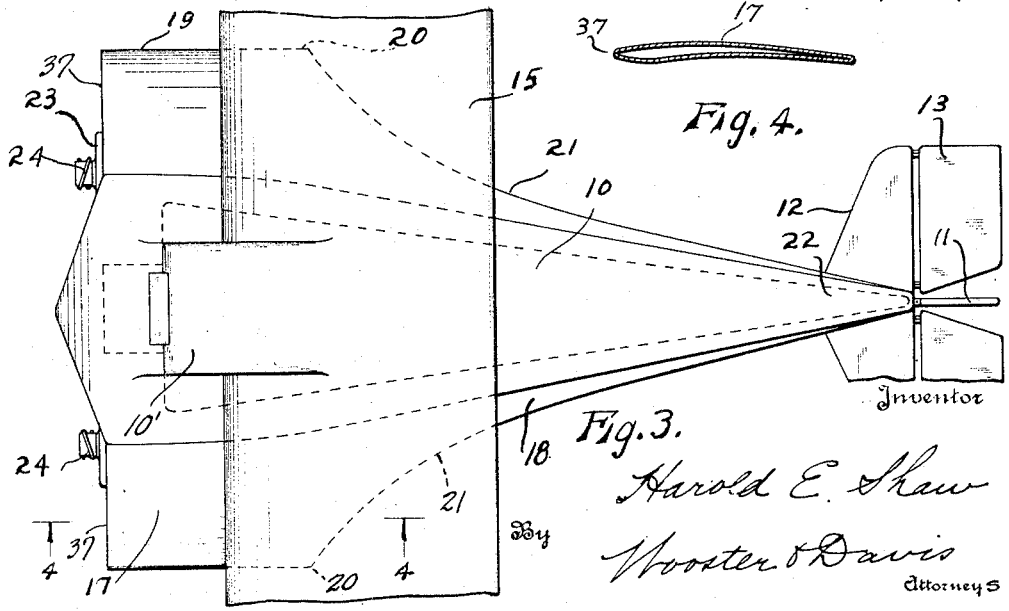
Fig. 4.
Fig. 3.
Inventor
Harold E. Shaw
By Wooster & Davis
Attorneys Patented Jan. 16, 1934

1,943,774

UNITED STATES PATENT OFFICE 1,943,774

AIRPLANE

Harold E. Shaw, Bridgeport, Conn.

Application August 19, 1930. Serial No. 476,299

13 Claims. (Cl. 244—14)

This invention relates to improvements in airplane constructions and has for an object to provide an airplane structure which will increase the controllability of the airplane when the motor or motors are going and which will have a certain parachute like effect when the motors are stopped, and will direct air currents against the stabilizers and tail control means to likewise increase the controllability.

A particular object of the invention is to provide an airplane construction in which the fuselage is out of the slip stream from the propellers, or at least is to one side of this slip stream and so is not directly in this stream and does not divide it as is common in other types of airplanes, and therefore, the slip stream is theoretically in its proper manner of flow. This also permits more powerful use of the slip stream on the tail and associated control elements.

Another object of the invention is to provide an airplane construction in which there is greater safety as spinning is remote and there is greater resistance to rolling, yawing and pitching.

A further object of this invention is to provide means for tilting the propeller or propellers and to provide a tiltable vane behind each propeller so that the lift may be increased and the run in taking off may be shortened.

With the foregoing and other objects in view, this invention comprises certain constructions, combinations and arrangements of parts as set forth, disclosed and claimed in the annexed specification as considered in connection with the accompanying drawing.

In this drawing:

Fig. 1 is a front view of an airplane embodying one form of this invention.

Fig. 2 is a side view of the airplane shown in Fig. 1.

Fig. 3 is a top plan view, and

Fig. 4 is a section on line 4—4 of Fig. 3 showing the leading edge of the tunnel structure.

There is shown in the drawing an airplane having a central fuselage 10 leading to the vertical rudder 11. Affixed to each side of the tail end 22 of the fuselage are the stabilizers 12 to which there are attached the elevators 13 while the tail skid 14 is placed on the bottom as usual. Near the head of the fuselage are attached the wings 15 on the back edges of which are placed the ailerons 16 as usual.

Affixed along each side of fuselage 10 is a partial tunnel or tube 17 open at the bottom as shown. The bottom of the fuselage is substantially V-shape as shown and merges into the inner side 18 of each partial tunnel. The outer edge 19 of the partial tunnel 17 runs straight back for a distance to a point 20 under the wing 15 and preferably at about the center of the wing this edge 19 begins to curve upwardly and back as at 21 until it almose merges into the tail 22 of the fuselage.

A motor 23 having a propeller 24 is mounted in each partial tunnel 17 on a suitable support 25 which is pivoted in the outer sides of the tunnel 17 and passes into the fuselage 10 where a hand lever 26, operable by the pilot, is placed to control the pivoting thereof, the lever 26 being adjustably held by rack 27 or other suitable means. By means of this lever 26, the position of the motor and hence of the propeller may be adjusted to tilt at an angle or set horizontally as desired. Although both the motor and propeller have been shown as being mounted in the tunnel it is obvious that the motor could be mounted elsewhere, as in the wing or in the fuselage, and be connected to the propeller in or in front of the tunnel by appropriate gearing to permit tilting of the propeller and further, that when mounted in the fuselage, or between two tunnels 17, the same motor could be used to run two or more propellers. A vane 28 may be similarly pivotally mounted on any suitable support as a rod 29 in each partial tunnel behind the motor, the rod 29 extending into the fuselage where it is controlled by a hand lever 30 adjustably held in position by rack 31 or other suitable means.

Landing wheels 32 can be placed on frames 33 depending from the lower outer edges 19 of the partial tunnels and may be made more secure by an additional brace 34 extending into the wing 15. If desired, another brace 35 may be fixed from the landing wheel to a block or bracket 36 on rod 25, although this latter brace 35 may be omitted if desired. There also may be a landing wheel below the fuselage if desired.

In order to reduce drag and increase lift, the partial tunnels or tubes 17 are preferably of airfoil construction as shown in cross section in Fig. 4, the leading edge being shown at 37. Although these features of this invention have been shown as applied to an airplane having a single fuselage, it is obvious that it may be likewise applied to a larger airplane having two or more fuselages and that more than two partial tunnels could be used. In fact, any number could be used as found desirable.

In operation, the usual rudder, elevator, aileron and motor controls would be provided. When taking off, the propellers 24 and vanes 28 may be appropriately tilted to increase the lifting power, thereby materially shortening the distance necessary in taking off. When in the air, the slip stream from the propeller will not be divided by the nose of the fuselage as in the usual plane, but will have a free sweep back and will flow freely in a substantially undivided stream and will be confined by the partial tunnels and directed by them against the tail controls, thereby increasing the air pressure on the rudder and elevator and giving the pilot better and more positive control. This guiding of the slip stream also has the effect of reducing the drag and the head air pressure, and thus increases the speed of the airplane. Should the motor stop while in the air, the tunnels will have a certain parachute like effect, and will catch the air and direct it against the tail surfaces, thus allowing the pilot better control and increasing the dead engine flying radius, giving the pilot more room in which to select a safe landing field.

The pilot's cabin could be located in the fuselage to extend somewhat above the wing if desired as indicated at 10'.

There are numerous and material advantages in the above described construction over the usual type of airplane. In the first place the induced drag is low and the lift to drag ratio is very high, giving higher ceilings and greater range. This also increases efficiency and economy. Thus, long distance flying can be more easily achieved as this type of plane has larger aspect ratios.

As the fuselage is not in the slip stream from the propeller this stream is theoretically in its proper manner of flow. In other words there is nothing to divide this stream as is the case where the fuselage is directly behind the propeller, and this stream is partially confined by the partial tunnel construction and can flow freely and directly back where it can have direct and maximum effect on the control elements such as the rudders, stabilizers, elevators and so forth. This gives better, more positive and more reliable control. Thus, the control and lifting surfaces can be mounted in the slip streams giving more powerful and effective control and also making it more sensitive. Therefore, take off and landing are improved and the necessary distance required is reduced. Furthermore, this partial tunnel construction prevents the spilling of slip stream air from the propellers, since it is caught and guided by the walls thereof. In ordinary airplanes this spilling of the slip stream air is a serious objection and is caused partially by the air being deflected side ways by the nose of the fuselage instead of flowing directly backward. This construction insures the air of the slip streams being directed backwardly against the controls.

With dead engines these partial tunnels will still cause backward flow of air through them to the controls. This will still cause the tail controls to be effective, and therefore, stalling of one or more of the motors will have less dangerous consequences. In ordinary planes when spinning the tail is out of the slip stream so control is lost or greatly reduced. This is not so in this construction and the powerful tail control will bring it out in a more effective manner. Furthermore, with this construction the liability of spinning is greatly reduced and remote, and safety is increased because the lateral resistance of the partial tunnel construction reduces rolling, yawing and pitching.

As the partial tunnels are open at the bottom they allow the slip streams to assist in lifting the plane thus giving greater lift. This is also important in reducing sinking when so called air pockets or lower pressure regions are encountered. The speed of the slip stream is ordinarily about 30 percent greater than the airplane speed, and when it is run into an air pocket or reduced pressure region the propellers tend to draw air in under the surfaces of the partial tunnels and tend to hold the plane up. Another feature in this connection is that ordinarily in airplane operation it is not desired to have the air or slip stream on the under side of the wings so the propeller is placed above the wings. In my construction, the air from the propellers is kept from the wings by the partial tunnel construction.

The control surfaces can be designed to work with only one engine, so that should either engine fail the machine can be flown with only one motor, thus giving increased safety and complying with the requirements of the Department of Commerce.

As indicated above, the walls of the partial tunnels may be and preferably are made in airfoil shape to increase their lift and efficiency, and any number of these partial tunnels may be employed as is found necessary or desirable.

The indications are in my construction that the slip streams create a suction on the rearward portion of the fuselage, thus giving a down load which balances or assists in balancing the rearward travel of the center of pressure of the wing. In other words, due to the rearward travel of the center of pressure, in level flying it is necessary to effect a down load to balance this effect. In ordinary planes this is effected by inclining the elevators which increases the drag. In my construction the suction on the fuselage produces this down load and, therefore, the induced drag of the down-tail is eliminated. Thus, the center of pressure effect is improved because the slip stream will neutralize forward travel of center of pressure in climbing and rearward travel in cruising or level flying.

Having thus set forth and disclosed the nature of this invention, what is claimed is:

1. In an airplane, a longitudinally extending fuselage, a wing extending laterally on opposite sides thereof, a partial tunnel on each side of the fuselage below the wing open at its lower side and extending longitudinally of the fuselage, control means rearwardly of the tunnels in position to be affected by the air stream therefrom, and a propeller at the forward part of each tunnel.

2. In an airplane, a longitudinally extending fuselage, control means at the rear end thereof, a transverse wing extending laterally on the opposite sides of the fuselage, a partial tunnel extending longitudinally of the fuselage on each side thereof below the wing and open at its lower side, and a propeller at the forward part of each tunnel in alignment therewith so that the slip stream from the propeller is caught by said tunnel walls and directed to said control means.

3. In an airplane, a longitudinally extending fuselage, control means at the rear end thereof, a transverse wing extending laterally on the opposite sides of the fuselage adjacent its upper edge, a partial tunnel extending longitudinally of the fuselage on opposite sides thereof under the wing and open at the lower side, the outer lower edge of said tunnel wall curving upwardly and rearwardly from a point under the wing to substantially merge with the fuselage adjacent its rear end, and a propeller in alignment with each partial tunnel at the forward end thereof.

4. In a multipropeller airplane having its tail control means in line with the fuselage, an open bottom partial tunnel merging into each side of the fuselage, a propeller for each tunnel, a mounting for the propeller in each tunnel, said tunnel serving to direct the substantially undivided slip stream of the propeller to the control means, and a wing extending laterally from the fuselage above the tunnels.

5. In a multipropeller airplane having its tail control means in line with the fuselage, an open bottom partial tunnel merging into each side of the fuselage, a propeller for each tunnel, a mounting for the propeller in each tunnel said tunnel serving to direct the substantially undivided slip stream of the propeller to the control means, the mounting for said propeller being pivotal, means for tilting said mounting, a vane pivotally mounted in the propeller slip stream, and means for tilting said vane.

6. In an airplane, a fuselage, stabilizers at the rear thereof, a transverse wing, an open bottomed partial tunnel on each side of the fuselage below the wing leading to the stabilizers, a tiltable propeller at the head of each tunnel and a tiltable vane in each tunnel behind each propeller.

7. An airplane comprising a fuselage, a transverse wing, an open bottomed partial tunnel on each side of the fuselage below the wing, a propeller at the head of each tunnel, the tunnel serving to conduct the substantially undivided slip stream to the tail control means, a vane behind each propeller in each tunnel, said propeller being tiltable.

8. An airplane comprising a fuselage, a transverse wing, an open bottomed partial tunnel on each side of the fuselage below the wing, a propeller at the head of each tunnel, the tunnel serving to conduct the substantially undivided slip stream to the tail control means, a vane behind each propeller in each tunnel, said propeller and said vane being each independently tiltable.

9. In an airplane having a fuselage, tail control means in line therewith, a partial tunnel or tube on each side of the fuselage open at the bottom, the outer side of each partial tunnel curving gradually upwardly from the region of the wing back to the end of the fuselage, said tunnels having the effect of catching the air and directing it against the tail control means to increase the controllability of the airplane.

10. In an airplane having a transverse wing, a partial tunnel or tube open at the bottom extending transversely of and located below the wing, a propeller in alignment with the partial tunnel adjacent the head of the tunnel, and control means in the slip stream to the rear of the propeller.

11. In an air plane, a longitudinally extending fuselage, a wing extending laterally on opposite sides thereof, control means at the rear end of the fuselage, a partial tunnel open at its lower side located on each side of the fuselage below the wing and extending longitudinally of the fuselage, a transverse vane in each tunnel, a propeller in alignment with each tunnel forwardly of the vanes so that the slip stream therefrom is caught by the walls of the tunnel and vanes and directed to the control means, and means for tilting the propellers and vanes.

12. In an airplane, a longitudinally extending fuselage, a transverse wing extending laterally on opposite sides thereof and forming the main support for the plane, a partial tunnel on each side of the fuselage below the wing open at its lower side and extending longitudinally of the fuselage, and control means rearwardly of the tunnels in position to be affected by the air stream therefrom, said partial tunnels having the effect of catching air and directing it against the control means to increase the controllability of the airplane.

13. In an airplane having a transverse wing, a partial tunnel or tube open at the bottom extending transversely of and located below the wing, a propeller in alignment with the partial tunnel adjacent the head of the tunnel, means for mounting the propeller to tilt on an axis extending transversely of the tunnel, control means in the slip stream to the rear of the propeller, and means to tilt the propeller on its axis to vary the effect of its slip stream on the walls of the tunnel and the control means.

HAROLD E. SHAW.